(12) United States Patent
He et al.

(10) Patent No.: US 8,948,443 B2
(45) Date of Patent: Feb. 3, 2015

(54) LUMINANCE EVALUATION

(75) Inventors: Shan He, Princeton, NJ (US); Jeffrey Adam Bloom, West Windsor, NJ (US); Dekun Zou, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/737,832

(22) PCT Filed: Aug. 18, 2009

(86) PCT No.: PCT/US2009/004702
§ 371 (c)(1),
(2), (4) Date: May 5, 2011

(87) PCT Pub. No.: WO2010/021691
PCT Pub. Date: Feb. 25, 2010

(65) Prior Publication Data
US 2011/0222723 A1 Sep. 15, 2011

Related U.S. Application Data

(60) Provisional application No. 61/189,363, filed on Aug. 19, 2008.

(51) Int. Cl.
*G06K 9/00* (2006.01)
*H04N 19/61* (2014.01)
(Continued)

(52) U.S. Cl.
CPC ........ *H04N 19/00781* (2013.01); *G06T 1/0028* (2013.01); *H04N 21/23892* (2013.01); *H04N 21/8358* (2013.01); *H04N 19/00151* (2013.01);
(Continued)

(58) Field of Classification Search
USPC .................................. 382/100, 124, 181, 305
See application file for complete search history.

(56) References Cited

U.S. PATENT DOCUMENTS 5,867,109 A 2/1999 Wiedeman
6,009,176 A 12/1999 Gennaro et al.
(Continued)

FOREIGN PATENT DOCUMENTS

CN 101218830 7/2008
EP 1515506 3/2005
(Continued)

OTHER PUBLICATIONS

Hu_Information hiding based on intra prediction modes for H.264 AVC, Multimedia & expo, 2007 IEEE, International conference on, IEEE, PI, Jul. 1, 2007, pp. 1231-1234.
(Continued)

*Primary Examiner* — Nancy Bitar
(74) *Attorney, Agent, or Firm* — Robert D. Shedd; Jeffrey M. Navon (57) ABSTRACT

A method comprises providing a change to apply to video; dividing video into blocks; creating propagation map which captures only specific changes to blocks that would be changed by the application of the change; evaluating the change based on a luminance criterion as being a perceptible change or an imperceptible change; for propagation maps of an imperceptible change, storing the propagation map to a list, wherein the propagation map is the principle data structure to be applied to the video. The propagation map can be created by using motion vector changes associated with the change.

32 Claims, 6 Drawing Sheets (51) Int. Cl.
| | |
|---|---|
| *G06T 1/00* | (2006.01) |
| *H04N 21/2389* | (2011.01) |
| *H04N 21/8358* | (2011.01) |
| *H04N 19/139* | (2014.01) |
| *H04N 19/467* | (2014.01) |
| *H04N 19/176* | (2014.01) |
| *H04N 19/51* | (2014.01) |
| *H04N 19/157* | (2014.01) |

(52) U.S. Cl.
CPC ... *H04N 19/00557* (2013.01); *H04N 19/00278* (2013.01); *H04N 19/00684* (2013.01); *H04N 19/00212* (2013.01); *G06T 2201/0051* (2013.01); *G06T 2201/0061* (2013.01); *G06T 2201/0202* (2013.01)
USPC .......................................................... 382/100

(56) References Cited

U.S. PATENT DOCUMENTS

| | | | |
|---|---|---|---|
| 6,064,661 A * | 5/2000 | Benn ............................. | 370/329 |
| 6,341,350 B1 | 1/2002 | Miyahara et al. | |
| 6,373,960 B1* | 4/2002 | Conover et al. ............... | 382/100 |
| 6,415,041 B1 | 7/2002 | Oami et al. | |
| 6,553,127 B1 | 4/2003 | Kurowski | |
| 6,687,384 B1 | 2/2004 | Isnardi | |
| 6,894,628 B2 | 5/2005 | Marpe et al. | |
| 6,900,748 B2 | 5/2005 | Marpe et al. | |
| 7,113,612 B2* | 9/2006 | Sugahara et al. ............. | 382/100 |
| 7,159,117 B2* | 1/2007 | Tanaka .......................... | 713/176 |
| 7,197,164 B2 | 3/2007 | Levy | |
| 7,286,710 B2 | 10/2007 | Marpe et al. | |
| 7,646,881 B2* | 1/2010 | Zarrabizadeh ................. | 382/100 |
| 7,839,312 B2 | 11/2010 | Tanaka et al. | |
| 7,865,034 B2* | 1/2011 | So ................................ | 382/274 |
| 7,974,714 B2* | 7/2011 | Hoffberg ........................ | 700/94 |
| 8,121,341 B2* | 2/2012 | Tapson et al. ................. | 382/100 |
| 8,189,854 B2 | 5/2012 | Watson et al. | |
| 8,559,501 B2* | 10/2013 | Chen et al. ............... | 375/240.02 |
| 8,571,256 B2* | 10/2013 | Tourapis et al. .............. | 382/100 |
| 8,588,459 B2* | 11/2013 | Bloom et al. ................. | 382/100 |
| 8,824,727 B2* | 9/2014 | Zou et al. ...................... | 382/100 |
| 2002/0071593 A1 | 6/2002 | Muratani | |
| 2002/0097892 A1 | 7/2002 | Oami et al. | |
| 2002/0136428 A1 | 9/2002 | Sugahara et al. | |
| 2003/0070075 A1 | 4/2003 | Deguillaume et al. | |
| 2003/0152225 A1* | 8/2003 | Kunisa .......................... | 380/210 |
| 2004/0017852 A1 | 1/2004 | Garrido et al. | |
| 2004/0168110 A1 | 8/2004 | Fuldseth et al. | |
| 2004/0247154 A1 | 12/2004 | Bodo et al. | |
| 2005/0044411 A1 | 2/2005 | Somin et al. | |
| 2005/0069169 A1 | 3/2005 | Zarrabizadeh | |
| 2005/0123207 A1* | 6/2005 | Marpe et al. .................. | 382/239 |
| 2005/0207499 A1 | 9/2005 | Hwang et al. | |
| 2006/0078292 A1 | 4/2006 | Huang et al. | |
| 2006/0222344 A1 | 10/2006 | Ukai et al. | |
| 2006/0236130 A1 | 10/2006 | Ito et al. | |
| 2006/0269096 A1 | 11/2006 | Kumar et al. | |
| 2007/0053438 A1 | 3/2007 | Boyce et al. | |
| 2007/0110033 A1 | 5/2007 | Tu et al. | |
| 2007/0242662 A1* | 10/2007 | Watson et al. ................. | 382/124 |
| 2008/0009272 A1 | 1/2008 | Toledano | |
| 2008/0063071 A1 | 3/2008 | Suzuki | |
| 2008/0165849 A1 | 7/2008 | Moriya et al. | |
| 2008/0247469 A1* | 10/2008 | Vadapalli et al. ........ | 375/240.27 |
| 2009/0279603 A1 | 11/2009 | Chen et al. | |
| 2009/0290750 A1* | 11/2009 | Tapson et al. ................. | 382/100 |
| 2011/0129116 A1 | 6/2011 | Thorwirth | |
| 2011/0176610 A1* | 7/2011 | He et al. ................... | 375/240.16 |
| 2011/0222723 A1* | 9/2011 | He et al. ........................ | 382/100 |
| 2011/0293016 A1 | 12/2011 | Suzuki | |
| 2012/0237078 A1 | 9/2012 | Watson et al. | |
| 2013/0058395 A1* | 3/2013 | Nilsson et al. ........... | 375/240.02 |
| 2013/0058405 A1* | 3/2013 | Zhao et al. ............... | 375/240.12 |
| 2013/0208814 A1* | 8/2013 | Argyropoulos et al. . | 375/240.27 |

FOREIGN PATENT DOCUMENTS

| | | |
|---|---|---|
| EP | 1909508 | 4/2008 |
| JP | 11331622 | 11/1999 |
| JP | 11341450 | 12/1999 |
| JP | 11346302 | 12/1999 |
| JP | 2001119557 | 4/2001 |
| JP | 2003125227 | 4/2003 |
| JP | 2003134329 | 5/2003 |
| JP | 2003179740 | 6/2003 |
| JP | 2003244419 | 8/2003 |
| JP | 2003529297 | 9/2003 |
| JP | 2004221715 | 8/2004 |
| JP | 2005533410 | 11/2005 |
| JP | 2006279992 | 10/2006 |
| JP | 2006287364 | 10/2006 |
| JP | 2006303580 | 11/2006 |
| JP | 2007053687 | 3/2007 |
| JP | 2007525074 | 8/2007 |
| WO | WO2004066206 | 8/2004 |
| WO | WO2007067168 | 8/2007 |
| WO | WO2008065814 | 6/2008 |
| WO | WO2008118145 | 10/2008 |
| WO | WO2008154041 | 12/2008 |

OTHER PUBLICATIONS

Nguyen_A fast watermarking system for H.264 AVC video, IEEE Asia-Pacific conference on circuits and systems, proceedings, APC-CAS-APCCAS 2006, Institute of electrical and electronics engineers INC. US, Dec. 4, 2006, pp. 81-84.
Winkler_Perceptual quality assessments for video watermarking, proceedings from the IEEE conference on standardization and innovation in information technology, Oct. 18, 2002, pp. 90-94.
Supplementary European Search Report dated Jul. 18, 2011.
European Search Report dated Sep. 24, 2009.
Nguyen et al., "A Fast Watermarking System for H.264/AVC Video," 2006 IEEE Dept. of Electronic Engineering, La Trobe University, Bundoora, Australia, pp. 81-84.
Seo et al., "Low-Complexity Watermarking Based on Entropy Coding in H.264/AVC," IEICE Trans. Fundamentals, vol. E91-A, No. 8, Aug. 2008.
Noorkami, "Secure and Robust Compressed-Domain Video Watermarking for H.264," A Thesis Presented to The Academic Faculty at Georgia Institute of Technology, 124 pages, Aug. 2007.
Zou et al., "H.264/AVC Stream Replacement Technique for Video Watermarking", ICASSP, 2008 IEEE, 2008.
Mobasseri et al., "Authentication of H.264 Streams by Direct Watermarking of CAVLC Blocks", Security, Steganography, and Watermarking of Multimedia Contents IX, Proceedings of SPIE-IS&T Electronic Imaging, SPIE, vol. 6505, 65951W. 2007.
Profrock et al., "H.264/AVC Authentication using Skipped Macroblocks for an Erasable Watermark", Visual Communications and Image Processing, 2005 SPIE, Bellinigham, WA 2005.
Hu, "Information Hiding Based on Intra Predictioin Modes for H.264 AVC", Multimedia and Expo, 2007 IEEE, International Conference, IEEE PI, Jul. 1, 2007, pp. 1231-1234.
Winkler, "Preceptual Quality Assessments for Video Watermarking", Proceedings from the IEEE Conference on Standardizaton and Innovation in Information Technology, Oct. 18, 2002, pp. 90-94.
Liu et al., "Data Hiding in Inter and Intra Prediction Modes of h.264/AVC", IEEE Int'l. Symposium on Circuits and Systems, 2008 (ISCAS 2008), May 18, 2008, pp. 3025-3028.
Song et al., "A Data Embedded Video Coding Scheme for Error-Prone Channels", IEEE Transactions on Multimedia, vol. 3, No. 4, Dec. 1, 2001, pp. 415-423.

* cited by examiner

LUMINANCE EVALUATION

CROSS-REFERENCE

This application claims the benefit, under 35 U.S.C. §365 of International Application PCT/US2009/004702, filed Aug. 18, 2009, which was published in accordance with PCT Article 21(2) on Feb. 25, 2010 in English and which claims the benefit of U.S. provisional patent application No. 61/189,363, filed Aug. 19, 2008.

This application relates to U.S. application Ser. No. 12/737,736 filed on Feb. 11, 2011 which published as US 2011-0135143A1; U.S. application Ser. No. 12/737,564 filed on Jan. 25, 2011 which published as US 2011-0176610A1; U.S. application Ser. No. 12/737,822 filed on Feb. 18, 2011 which published as US 2011-0142419A1; U.S. application Ser. No. 12/737,783 filed on Feb. 15, 2011 which published as US 2011-0142418A1; U.S. application Ser. No. 12/737,829 filed on Feb. 18, 2011 which published as US 2011-0158465A1; and PCT Application PCT/US11/000223 filed on Feb. 7, 2011 which published as WO2011/100048A1.

FIELD OF THE INVENTION

The present invention relates to a method for quantitatively evaluating watermarks and applying watermarks to video.

BACKGROUND OF THE INVENTION

Today, the demand for digital watermarking as an antipiracy technology is strong. To make it more difficult for pirates to circumvent watermarks it is important for many potential watermarks to be proposed and used.

Unfortunately, watermarking makes changes that affect pixels in a given region of video. As such, it is important for watermarks to not make changes which can interfere with the intended viewing experience for the intended audience. Consequently, a need exists to evaluate potential watermarks with a metric that determines if the imagery with the watermark would perceptually be the same as the imagery without the watermark, prior to embedding.

SUMMARY OF THE INVENTION

An aspect of the invention is a method comprising the steps of providing watermarks to apply to video; determining based on a luminance and/or chrominance criterion whether the watermark is an imperceptible watermark or a perceptible watermark; and adding imperceptible watermarks to a list. The method can include the steps of assessing luminance and/or chrominance change of the video associated with the application of the watermark; calculating the luminance and/or chrominance change for only some of the blocks, wherein no calculation is performed on at least one other block; and constructing a propagation map for the watermark. The propagation map includes the blocks having some luminance and/or chrominance change. The method can further comprise calculating the luminance and/or chrominance change due to motion vector change.

Additionally, a method according to the invention is characterized by the steps of providing a watermark to apply to video; determining quantitatively an introduced change in luminance and/or chrominance if the watermark would be embedded; determining based on the obtained quantitative value whether the watermark is an acceptable watermark or an unacceptable watermark; and adding acceptable watermarks to a list. Additional steps can include different combinations of the steps of dividing frames of the video into blocks; calculating the luminance change for only some of the blocks, wherein no calculation is performed on at least one other block; calculating only the luminance and/or chrominance change for some of the blocks, wherein no calculation is performed on exact luminance and/or chrominance value of those blocks; and constructing a propagation map for the watermark, the propagation map including the blocks having some luminance and/or chrominance change. The propagation maps for the watermark can store a reference frame number, original motion vectors and new motions. The luminance changes can be calculated based on motion vector change, intra-prediction reference change, and/or inter-prediction changes to the blocks. A detection reference value for watermark detection can also be established using the calculated luminance and/or chrominance change. Additional steps can include applying a watermark from the list to the video and filtering watermarks from the list that do not meet payload constraints.

Additionally, a method according to the invention comprises accessing an original video sequence; accessing or generating a change list; evaluating or calculating individual luminance and/or chrominance changes to blocks for a prospective change on change list; constructing a difference slice from the at least one of the individual luminance and/or chrominance changes, the difference slice containing a group of blocks affected by the prospective change; and updating the difference slice from the at least one of the individual luminance and/or chrominance changes, wherein the individual luminance and/or chrominance changes are estimates and not exact luminance and/or chrominance values. Features can include initializing the difference slice at the start of every prospective change in the change list; updating the difference slice after each luminance and/or chrominance evaluation or calculation of the individual luminance and/or chrominance changes to the blocks. The estimates of the individual luminance and/or chrominance changes can be based on motion vector change associated with the prospective change. The estimates of the individual luminance and/or chrominance changes can be based on intra-predicting luminance and/or chrominance changes of a current block using luminance and/or chrominance changes in border pixels in neighboring blocks adjacent to the specific target block.

Also provided is an apparatus comprising a means for applying watermarks to video; a means for predicting changes in luminance and/or chrominance, if a watermark would be embedded; a means for determining acceptability of watermarks based on predicted changes; and a means for adding acceptable watermarks to a list. The apparatus can also include a means for dividing frames of the video into blocks; a means for calculating only the luminance and/or chrominance change for some of the blocks, wherein no calculation is performed to yield exact luminance and/or chrominance value of those blocks; a means for constructing a propagation map for the watermark, wherein the propagation map can include the blocks having some luminance and/or chrominance change and the propagation map can store a reference neighbor block number and the prediction mode; a means for calculating by inter-prediction changes to the blocks; a means for calculating by intra-prediction changes to the blocks; and a means for generating a detection reference value for watermark detection using the calculated luminance and/or chrominance change.

BRIEF DESCRIPTION OF THE DRAWINGS

The invention will now be described by way of example with reference to accompanying drawings.

DESCRIPTION OF THE INVENTION

The invention pertains to the evaluation and implementation of watermarks and embodiments of the invention include list creation steps which can be followed by a set of list filtering steps. The output of the list creation steps is a list of changes that can be made which are not objectionable to a viewer. The filtering steps retain changes in the list that satisfy at least one constraint, but would preferable satisfy various constraints. The most important constraint is that after watermark embedding, the marked imagery should look perceptually the same as the unmarked original imagery.

A key feature of the invention is an estimation and/or calculation of luminance and chrominance changes due to motion vector change or intra-prediction reference change. The process of evaluating changes caused by modifying a motion vector value during watermark embedding is herein referred to as LumEval. LumEval measures the amount of luminance change for each block, which can be used to evaluate the changes, such as fidelity assessment in a watermarking application.

Several other key features of the invention are: obtaining inter-predicted block luminance evaluation without fully reconstructing the modified luminance; constructing and updating slice differentials after each block's luminance evaluation, and using differentials to construct the modified slice for intra-prediction; determining intra-predicted block luminance evaluation based on the mode and original/difference slices; and applying LumEval for fidelity assessment, robustness assessment, and detection in watermarking.

Further, features of the invention are particularly applicable to the AVC/CABAC (Advanced Video Compression/Context-based Adaptive Binary Arithmetic Coding) watermarking methodologies in which a number of steps relate to embedding. The embedding can include an analysis step in which video content is analyzed to create a list of changes that can be used in embedding. The analysis step can be roughly described as a list creation process followed by a set of list filtering processes. The output of the list creation process is a list of changes that can be implemented without disrupting the AVC/CABAC compliance of the bitstream. The filtering operations are designed, for example, to remove changes that would introduce visible artifacts, remove changes that would be difficult to recover, and generate a set of changes that are compliant with other external constraints such as payload constraints and other application constraints.

At least one embodiment described herein attempts to quantitatively identify the luminance difference introduced by the changes. The luminance difference information can be crucial in many aspects including the following: fidelity assessment; robustness assessment; and detection. In fidelity assessment, the luminance difference is used to identify changes that would introduce visible artifacts. This can allow removal of those changes that would otherwise introduce visible artifacts into the marked video. Such visible artifacts would generally be unacceptable. Regarding robustness assessment, the luminance difference is used to help identify changes that are not expected to be robust enough to survive common processing applied to the watermarked content as well as those changes that are expected to provide good robustness. For detection, the luminance difference can be used as a reference value during watermark detection.

In an application of the invention, there is a list of changes, each of which is evaluated in terms of the change in luminance that it would introduce. In general, there can be interactions between the luminance changes introduced by one change and that introduced by another. Therefore, each change is treated independently. The luminance evaluation indicates the luminance change that a given change would introduce assuming that no other changes are made.

The rigorous methodology for calculating the luminance difference between two video sequences is to generate both the original video and modified video and take the difference. This method generates the modified video by decoding the modified H.264/AVC bitstream; a process which is typically computational expensive and storage consuming. Furthermore, given a list of changes, it is possible to do the decoding for each of the changes in the list. This typically requires large overhead that generally makes this rigorous methodology infeasible for an application with a long list of changes to be evaluated. The watermarking application can, in at least one implementation, have on the order of 2,000 changes per minute of imagery. Other implementations can have more or fewer changes per minute.

Details of the lumEval algorithm begin with a consideration of the modification of a motion vector value in an inter-predicted block during watermark embedding. Such a change will result in a change in the pixel value prediction for the block and thus, assuming that the original residual is still used, a change in the reconstructed pixel values. In many cases, this change will affect the luminance of the reconstructed block.

A propagation map can be employed which indicates the blocks affected by the modification of a single motion vector. The change of one motion vector can affect the luminance of the macroblock itself (inter-prediction), the inter-predicted blocks on the propagation map, and the intra-predicted blocks on the propagation map.

Figure 13:
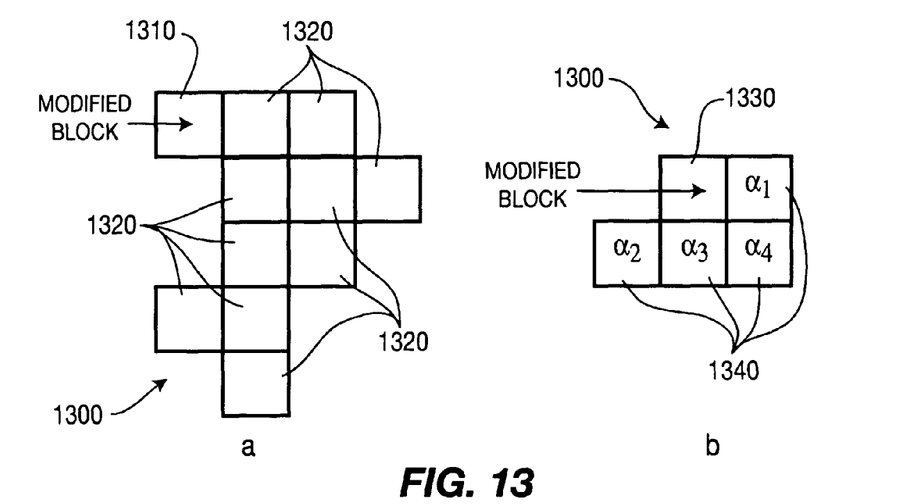
FIG. 13 is an illustration of a propagation map.

FIG. 13(a) illustrates one example of a propagation map. This propagation map 1300 is associated with one B-slice block 1310 whose motion vector has been directly changed. The other blocks 1320 in the figure are blocks that will be indirectly changed due to propagation. When a block changes, either due to a direct modification or because it falls in the propagation path of another change, this change has the potential to further propagate to its neighbors. FIG. 13(b) illustrates another example of a propagation map wherein the four neighbors 1340 whose luminance values can be modified due to this propagation, when only one block 1330 was directly changed. The propagation map, P, of a changed block represents a collection of the blocks, p, whose luminance values are also changed due to propagation. Each block in the propagation map is represented with a data structure indicating the initial change, the prediction mode of the current block, and the change in the current block and is denoted as:

p={head_node_info,mode,cur_node_info}.

The "head_node" uniquely identifies the changed block in terms of position and the alternative value of the motion vector that initiated the changes. All of the nodes in the propagation map P will have the same "head_node." The element "mode" indicates the prediction mode of the current block, which can be either intra-prediction or inter-prediction. The element "cur_node" records the information about the current block. It contains the original and new motion vectors for inter-predicted blocks, and intra-prediction mode and reference blocks for intra-predicted blocks.

Figure 14:
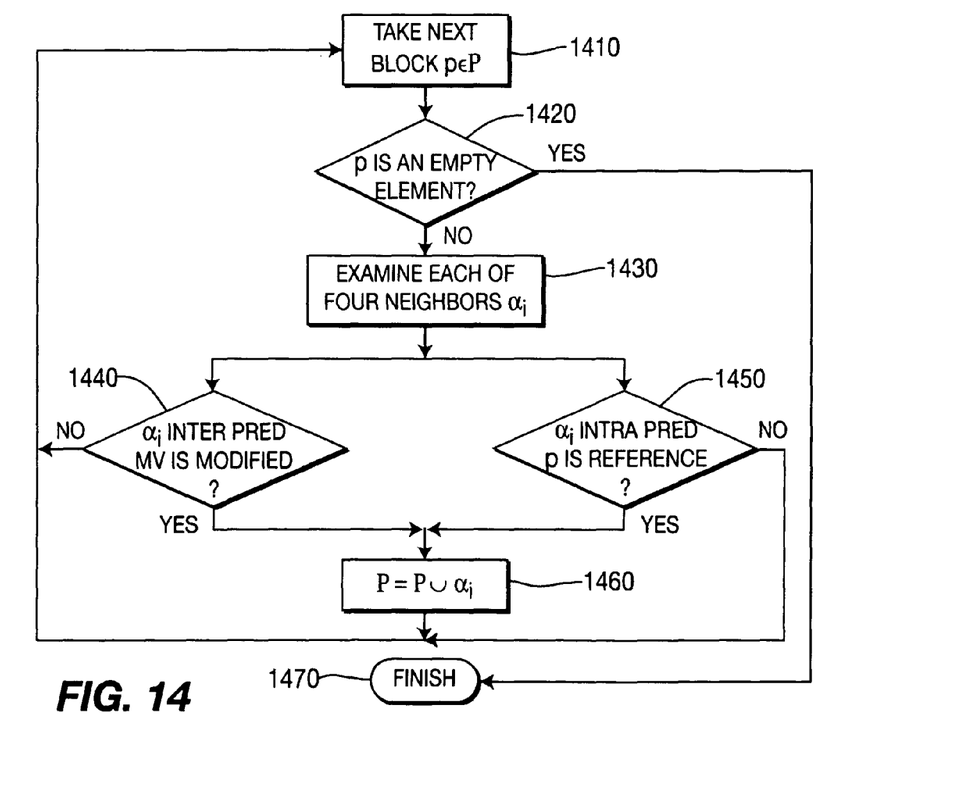
FIG. 14 is a block diagram illustrating the construction of propagation map.

FIG. 14 shows a method for constructing the propagation map. The propagation map, P, is initialized with the changed block, p, in 1410. In evaluation box 1420, a determination is made to evaluate whether block p is empty. If block p is not empty, each of its four neighbors $\alpha_i=1, \ldots, 4$ (as defined in FIG. 13b) is examined in box 1430. The goal of each of these examinations is to determine if the change to block p will propagate to neighbor $\alpha_i$. To do this, the decoding using the original values associated with p can be compared to the changed values. If block $\alpha_i$ is an inter-predicted block, then in the inter-prediction pathway 1440, the motion vector predicted using the new motion vector of p and those of the other neighbor blocks can be examined. If it is different from the original motion vector, then the change will propagate to this neighbor and block $a_i$ is appended to the propagation map P in propagation box 1460. If $\alpha_i$ is intra-predicted in the intra-prediction pathway 1450 and block p is used as the reference in the prediction, then the change will propagate to this neighbor and block $\alpha_i$ is appended to the propagation map P in the propagation box 1460. After all the four neighbors have been examined, the next element in P is considered. This process repeats until there are no new elements in P to arrive at finish box 1470.

Now, for an inter-predicted block, access to the original motion vector ($mv_{org}$) and the modified motion vector ($mv_{new}$) along with the prediction weight information can be assumed. The luminance after the modification is denoted $L_{new}$ and is the weighted sum of two predictions (assuming bi-prediction) plus the residue.

$$L_{new}=w_0 \times MC(mv_{0\_new})+w_1 \times MC(mv_{1\_new})+residue$$

where $w_0$ and $w_1$ are the weights used for list 0 prediction and list 1 prediction in bi-prediction, respectively; and MC(•) stands for the motion compensated prediction function. Note that this equation has two motion vectors, $mv_{0\_new}$, and $mv_{1\_new}$. This is a consequence of bi-prediction. Similarly, the luminance before the modification, denoted $L_{org}$, is calculated as follows.

$$L_{org}=w_0 \times MC(mv_{0\_org})+w_1 \times MC(mv_{1\_org})+residue.$$

Thus, the change in luminance, denoted $\Delta L$, can be calculated as $$\Delta L = L_{new} - L_{org}$$
$$= [w_0 \times MC(mv_{0\_new}) + w_1 \times MC(mv_{1\_new}) + residue] -$$
$$[w_0 \times MC(mv_{0\_org}) + w_1 \times MC(mv_{1\_org}) + residue]$$

-continued
$$= w_0 \times [MC(mv_{0\_new}) - MC(mv_{0\_org})] +$$
$$w_1 \times [MC(mv_{1\_new}) - MC(mv_{1\_org})].$$

Next, in embodiments of the invention, it is possible to focus on the case in which the watermarking process modifies only one of the two motion vectors. In that case one of the $mv_{new}$ motion vectors will be equal to the corresponding $mv_{old}$. The corresponding term in the above equation for $\Delta L$ will vanish leaving:

$$\Delta L=w_x \times [MC(mv_{x\_new})-MC(mv_{x\_org})] \quad (1)$$

where the subscript x indicates the motion vector that was modified. It can be observed that there is only a need to calculate the luminance change in the motion compensated differences of the list x prediction rather than reconstructing all of the pixel values in the block both before and after the modification. The result of this difference, weighted by $w_x$, will be the luminance difference due to embedding.

The luminance change, $\Delta L$, is a block of pixels from which any of a number of measures to represent the fidelity evaluation can be calculated. Two example measures are the sum of luminance difference and the maximum absolute difference. In at least one embodiment, the sum of the absolute luminance difference is used.

In the H.264 standard (ITU-T H.264 Standard: Advanced video coding for generic audiovisual services, 2005/03), many inter-predicted blocks derive their motion vector from those of their neighbors, so the modification of a motion vector in one inter-predicted block can produce a change in the motion vector of an adjacent inter-predicted block. This change in the neighbor can affect the luminance of that neighbor and can itself further propagate to its neighboring inter-predicted blocks.

The resulting pixel changes to a reconstructed block can also produce pixel changes in neighboring intra-predicted blocks. These changes can also further propagate to other intra-predicted blocks.

The propagation map indicates which blocks will be affected by the modification of a single motion vector. The change of one motion vector can affect the luminance of the macroblock itself (inter-prediction), the inter-predicted blocks on the propagation map, and the intra-predicted blocks on the propagation map.

LumEval can use the propagation map to evaluate the luminance changes in all blocks affected by the change of a single motion vector. This includes the directly affected block as well as all of the blocks that are indirectly affected due to propagation. The change of the luminance for any inter-predicted block in the propagation map is evaluated according to the application of the above equations.

Figure 1:
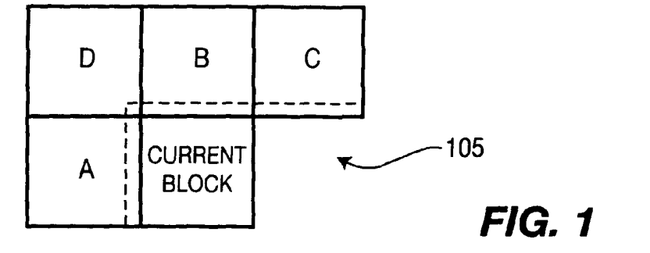
FIG. 1 represents neighbor blocks involved in intra-prediction.

Intra-prediction of blocks will now be discussed. Intra-prediction uses the border pixels of the neighboring blocks to predict the pixel values for the current block. See FIG. 1 for an example of neighbor blocks involved in intra-prediction. When an intra-predicted block is on a propagation map, the reference neighbor block has changed. In order to determine the effect on the current block, the LumEval will need to reconstruct the change to the border pixels of the reference neighbor.

The luminance of the intra-predicted block before the modification is denoted $L_{org}$ and is the sum of the intra-prediction from block N and the residue, where N is one or more neighbors from the set A, B, C, and D.

$$L_{org}=IntraP(L_{N\_org})+residue$$

IntraP(•) is the intra-prediction function which depends on the intra-prediction mode specified for the current block. Similarly, the luminance of the intra-predicted block after modification is $L_{new}$ defined as:

$$L_{new} = \text{Intra}P(L_{N\_new}) + \text{residue},$$

and the change in luminance is:

$$\Delta L = L_{new} - L_{org}$$
$$= \text{Intra}P(L_{N\_new}) - \text{Intra}P(L_{N\_org}).$$

The new luminance in neighboring block N, $L_{N\_new}$, is the original luminance in that block plus a change, $\Delta L_{N}$. With this it is possible to rewrite the prediction after the modification as $$\text{Intra}P(L_{N\_new}) = \text{Intra}P(L_{N\_org} + \Delta L_{N}).$$

And the luminance difference becomes:

$$\Delta L = \text{Intra}P(L_{N_{org}}) - \text{Intra}P(L_{N\_org} + \Delta L_{N}). \quad (2)$$

It can be seen that, different from inter-predicted blocks, LumEval on an intra-predicted block requires the luminance difference $\Delta L_{N}$ from its neighbor blocks. Assuming that blocks in the block pattern 105 or in a propagation map are listed in decoding order and that LumEval is applied to these blocks in the order listed, the $\Delta L_{N}$ required by the current intra-predicted block will have already been obtained during application of LumEval to previous blocks. In order for quick access to $\Delta L_{N}$, a slice, called a "difference slice," for each propagation map can be constructed. According to the H.264 standard (ITU-T H.264 Standard: Advanced video coding for generic audiovisual services, 2005/03), changes do not propagate past the end of the slice. Therefore, LumEval will not need to save the block differences for a region larger than a slice. A different slice stores the luminance differences of the blocks on a propagation map, $\Delta L$ from Equation (1) or Equation (2), after they are calculated. $\Delta L_{N}$ for a future block can then be retrieved from this difference slice.

Note that creation of the difference slice does not represent any additional computation. Application of LumEval to an inter-predicted block requires the calculation of $\Delta L$ in Equation (1). This block of data can be saved to the difference slice. The difference slice can first be initialized to all zeros prior to applying LumEval to the first block of a propagation map. Similarly, application of LumEval to an intra-predicted block requires the calculation of $\Delta L$ in Equation (2) and this block of data is saved to the difference slice.

Figure 2:
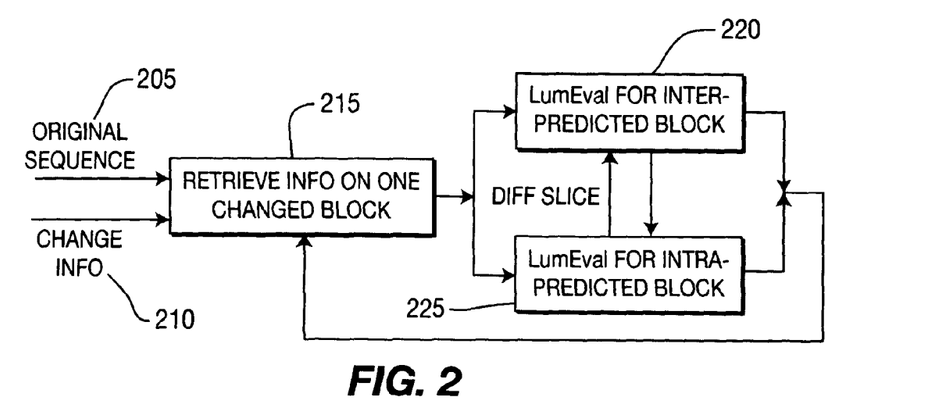
FIG. 2 is a block diagram of LumEval calculation.

FIG. 2 shows the overview of LumEval. The inputs to the algorithm are the original video sequence 205, the change list 210, and the block pattern 105 of each change in the change list. Information on each changed block in the propagation map are fed through retrieval box 215 and fed into the LumEval calculation. The propagation map contains all the blocks that are affected by one change listed in decoding order. The propagation map stores the following information with each block on the propagation map: if it is inter-predicted, reference frame number, original and new motion vectors are stored, and if it is intra-predicted, intra-prediction mode and reference neighbor blocks are stored. For each entry in the change list, LumEval is applied to each block on the propagation map. The first block on the propagation map is the inter-predicted block in which the change was made. This is uniquely true in this invention. The inter-predicted blocks 220 and the intra-predicted blocks 225 are analyzed according to the protocol outlined earlier. The difference slice is initialized at the start of every entry in the change list and updated after luminance evaluation for every block in the propagation map of that change.

Figure 3:
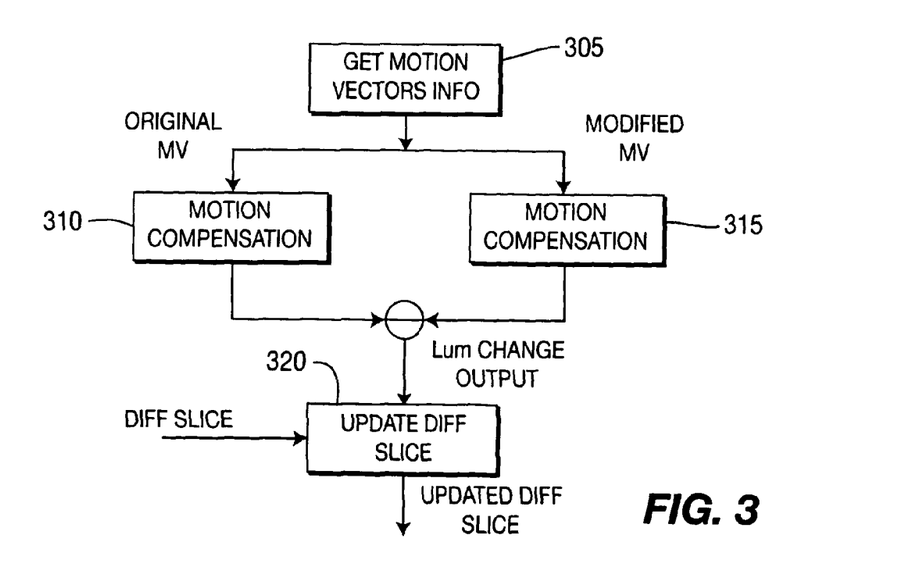
FIG. 3 illustrates the LumEval process for inter-predicted blocks.

FIG. 3 illustrates the LumEval process for inter-predicted blocks. Both original and modified motion vectors are retrieved 305 and used to perform two different motion compensations to obtain two block predictions: one for the original motion vectors 310 and one for the modified motion vectors 315. The difference between these two predictions can be output for further processing and is also used to update the difference slice 320 in the corresponding block position.

As just mentioned, the output of LumEval is the difference between the two predictions. However, in some applications other derivatives of this difference can be of useful. For example, a preferred embodiment calculates and outputs the sum of the values in the difference block and the sum of the absolute value of the differences.

Figure 4:
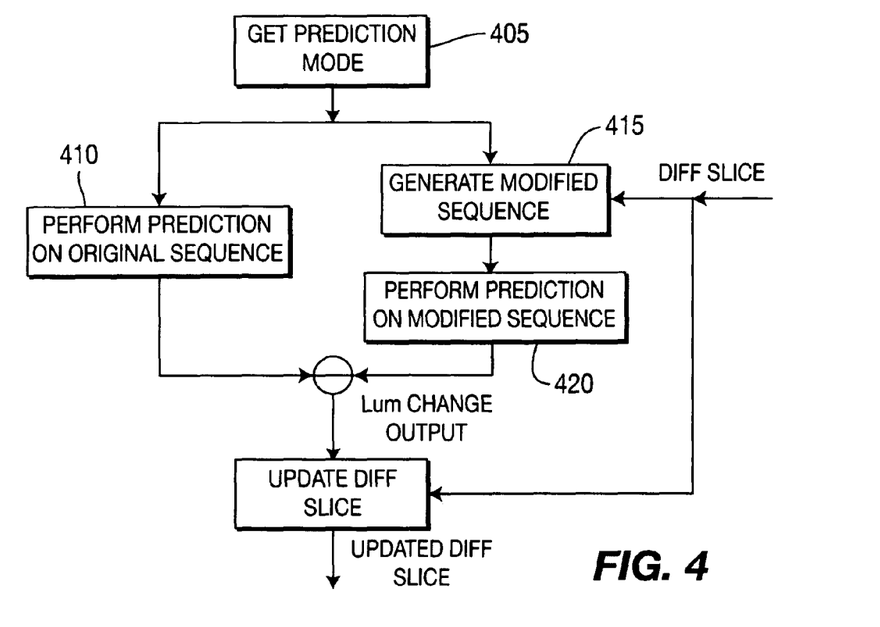
FIG. 4 illustrates the LumEval process for intra-predicted blocks.

FIG. 4 illustrates the LumEval process for intra-predicted blocks when the type of prediction to be performed is identified 405. Intra-prediction is performed on the original sequence 410. Following the generation of a modified sequence 415, intra-prediction of the modified sequence 420 is performed as well. The modified sequence is derived from original and difference slice as described in Equation (2). Again, the difference of these two predictions is used to update the difference slice and is either outputted or produced directly or used to derive the outputs or products.

Two basic versions of LumEval implementation are outlined: a stand-alone version and a version integrated into AVC_Decoder/Propmap. The AVC_Decoder/Propmap is a tool built in an AVC_Decoder to identify the changed block list. A more detailed description of the tool is provided later in this description.

Figure 5:
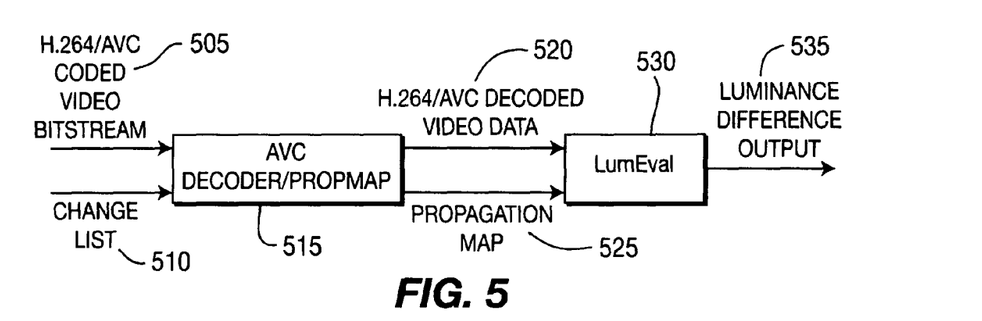
FIG. 5 illustrates the stand-alone version of LumEval methodology.

FIG. 5 illustrates the stand-alone version of LumEval 530. Here the coded video 505 and the change list 510 are fed into the AVC decoder/propagation map generator 515. Additional inputs for the stand-alone LumEval 530 are the propagation map for each change which is generated by the AVC decoder/propagation map generator 515 and the decoded, original YUV file 520 which is also generated by the AVC decoder/propagation map generator 515. The output 535 will indicate the luminance change for each block in the propagation map of each entry of the input list of changed blocks.

Note that the stand-alone LumEval requires the original YUV file as input. This YUV file can require significant disk space for storage and can incur significant amount of time to write (in AVC_Decoder/Propmap) and then to read (in LumEval). A more efficient implementation integrates the LumEval into the AVC_Decoder/Propmap. This avoids the need to save the decoded YUV sequence; saving storage space and speeding run-time.

Figure 6:
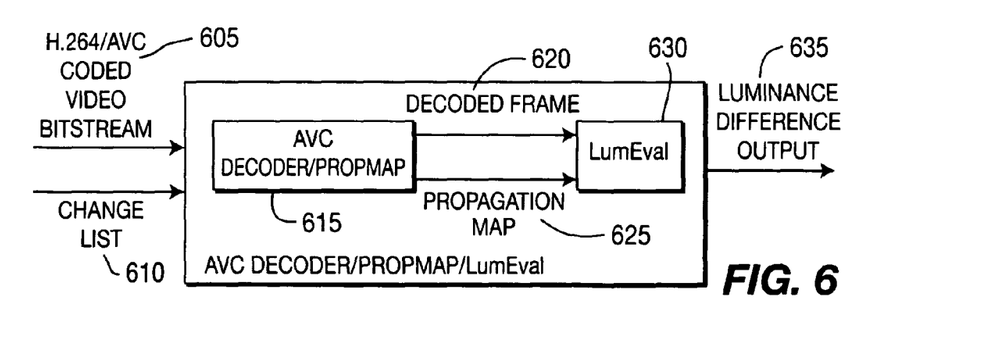
FIG. 6 illustrates the integrated implementation of LumEval into the AVC_Decoder/Propmap tool.

FIG. 6 illustrates the integrated implementation of LumEval into the AVC_Decoder/Propmap tool. The core implementation of the integrated LumEval is the same as the stand-alone version in that the coded video 605 and the change list 610 are fed into the AVC decoder/propagation map generator 615, which also generates propagation maps 625. The major difference is that the integrated version reads changed block information directly from the data structure built in the AVC_Decoder/Propmap, rather than reading it from a file, and reads the original YUV frame 620 from the buffer, rather than from a file. Thus, the integrated LumEval 630 does not require any external input files. The outputs 635 are the same as the stand-alone version.

As indicated earlier, a more detailed discussion on intra-prediction is now presented. Intra-predicted macroblocks are coded as the sum of a prediction from within the current frame/picture and a residual. If one or more of the reference blocks are on the propagation map of a change, then the prediction can be affected by that change, in which case the current block would be also on the propagation map. There can be three types of intra-prediction: intra_4×4, intra_8×8, and intra_16×16.

In the Intra_4×4 mode, the macroblock is predicted for each of the 16 4×4 blocks. There are a total of 8 modes (per table 8-2 of ITU-T Recommendation H.264|ISO/IEC 14496-10 International Standard with Amendment 1) involving all 4 of the neighboring blocks, A, B, C, and D shown in FIG. 1. The 8 modes are listed in Table 1 below along with the involved neighboring block(s) (adapted from Table 8-2 of ITU-T Recommendation H.264|ISO/IEC 14496-10 International Standard with Amendment 1). In the table, different from the Table 8-2 of the standard, the three different cases for the Intra_4×4_DC mode can be distinguished: mode 2—uses both A and B; mode 9—uses only A; mode 10—uses only B. The fourth case of 4×4_DC mode is to use neither A nor B, which does not affect the propagation map and thus can be ignored.

TABLE 1

4 × 4 Intra-Prediction Modes

| Intra_pred mode (4 × 4) | Name | Involved Neighbor(s) |
|---|---|---|
| 0 | Intra_4 × 4_Vertical | B |
| 1 | Intra_4 × 4_Horizontal | A |
| 2 | Intra_4 × 4_DC(1) | A, B |
| 3 | Intra_4 × 4_Diagonal_Down_Left | B, C |
| 4 | Intra_4 × 4_Diagonal_Down_Right | B, A, D |
| 5 | Intra_4 × 4_Vertical_Right | B, A, D |
| 6 | Intra_4 × 4_Horizontal_Down | B, A, D |
| 7 | Intra_4 × 4_Vertical_Left | B, C |
| 8 | Intra_4 × 4_Horizontal_Up | A |
| 9 | Intra_4 × 4_DC(2) | A |
| 10 | Intra_4 × 4_DC(3) | B |

In the Intra_8×8 mode, the macroblock is predicted for each of the four 8×8 blocks. There are 8 modes (per table 8-3 of ITU-T Recommendation H.264|ISO/IEC 14496-10 International Standard with Amendment 1) involving all 4 of the neighboring blocks, A, B, C, and D as shown in FIG. 4. The 8 modes are listed in Table 2 below along with the involved neighboring block(s) (adapted from Table 8-3 of ITU-T Recommendation H.264|ISO/IEC 14496-10 International Standard with Amendment 1). Similar to the 4×4 intra-prediction case, the three different cases for the Intra_8×8_DC mode can also be distinguished. Note that due to a filtering operation before the prediction, the involved neighbors for each mode are different from 4×4 prediction.

TABLE 2

8 × 8 intra-prediction modes

| Intra_pred mode (8 × 8) | Name | Involved Neighbor(s) |
|---|---|---|
| 0 | Intra_8 × 8_Vertical | B, C, D |
| 1 | Intra_8 × 8_Horizontal | A, D |
| 2 | Intra_8 × 8_DC(1) | A, B, C, D |
| 3 | Intra_8 × 8_Diagonal_Down_Left | B, C, D |
| 4 | Intra_8 × 8_Diagonal_Down_Right | A, B, C, D |
| 5 | Intra_8 × 8_Vertial_Right | A, B, C, D |
| 6 | Intra_8 × 8_Horizontal_Down | A, B, C, D |
| 7 | Intra_8 × 8_Vertical_Left | B, C, D |
| 8 | Intra_8 × 8_Horizontal_Up | A, D |

TABLE 2-continued

8 × 8 intra-prediction modes

| Intra_pred mode (8 × 8) | Name | Involved Neighbor(s) |
|---|---|---|
| 9 | Intra_8 × 8_DC(2) | A, D |
| 10 | Intra_8 × 8_DC(3) | B, C, D |

In the Intra_16×16 mode, the macroblock is predicted as a whole. There are 4 modes (per table 8-4 of ITU-T Recommendation H.264|ISO/IEC 14496-10 International Standard with Amendment 1) involving 3 neighboring blocks, A, B, and D as shown in FIG. 4. Table 3 lists the prediction modes. In order to be consistent with the 4×4 and 8×8 predictions, modes 2, 9 and 10 can still be used to indicate the three cases of the DC prediction.

TABLE 3

16 × 16 intra-prediction modes

| Intra_pred mode (16 × 16) | Name | Involved Neighbor(s) |
|---|---|---|
| 0 | Intra_16 × 16_Vertical | B |
| 1 | Intra_16 × 16_Horizontal | A |
| 2 | Intra_16 × 16_DC(1) | A, B |
| 3 | Intra_16 × 16_Plane | A, B, D |
| 9 | Intra_16 × 16_DC(2) | A |
| 10 | Intra_16 × 16_DC(3) | B |

Specifically, the reference components are neighbor A's rightmost column, neighbor B's last row, neighbor C's last row, and neighbor D's last (lower-right) pixel as shown in FIG. 4. If C is not available, the reference pixels in C are replaced by the rightmost pixel of B's last row with repetition.

The H.264/AVC watermarking system generates a list of potential changes and then goes through a series of steps in which some of the potential changes are eliminated from the list. Each entry in the list represents a change to a motion vector associated with a B-slice inter-predicted macroblock. Changing the motion vector of an inter-predicted block will have the effect of reconstructing the block with a different reference than what was intended during encoding, thus changing the decoded pixel values. This change can propagate in 2 ways: (1) if a second block is coded using inter-prediction and predicts its motion vector from the current, then that second block will also use a different reference than what was intended; and (2) if a second block is coded using intra-prediction and predicts its pixel values from the current, then the reconstructed pixels of that second block will be different from what was intended. The first kind of propagation, propagation to a neighboring motion vector, can again propagate to the next set of neighbors in the same way. The second kind of propagation, propagation directly to the pixel values, can only propagate further to neighboring blocks that also use intra-prediction.

Figure 7:
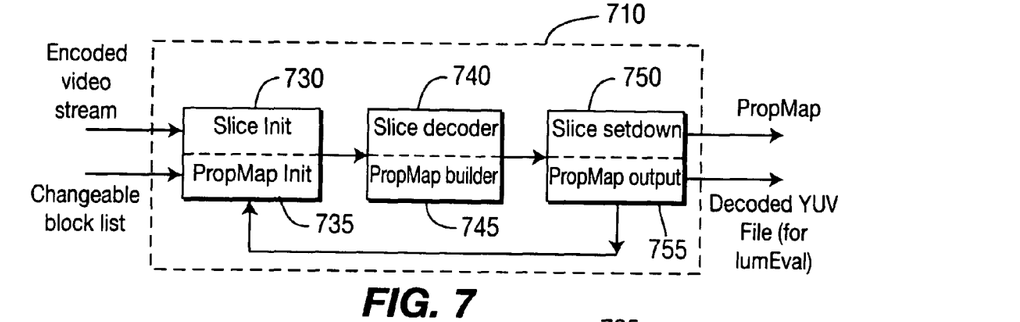
FIG. 7 illustrates an AVC decoder based propagation map construction.

Also as indicated earlier, a more detailed discussion on AVC decoder-based propagation map construction is now presented for a decoder 710. Note that the motion vector prediction and intra-prediction are performed within one slice. Thus the propagation of one motion vector change cannot propagate outside of the current slice. Therefore, the propagation map can be constructed slice-by-slice. The standard H.264/AVC decoder loops through the three steps: (1) slice Initialization 730, (2) slice decoder 740, and (3) slice setdown 750 for each slice in the image sequence. The propagation map construction takes place in this context, processing one slice at a time.

Propagation map construction takes the original encoded video stream as one input. The other input is the list of all potential modifications. The process can be described as a series of three steps in FIG. 7: (1) propagation map initialization 735, (2) propagation map builder 745, and (3) propagation map output 755, in which finalized outputs are used to decode YUV for luminance evaluation.

Figure 8:
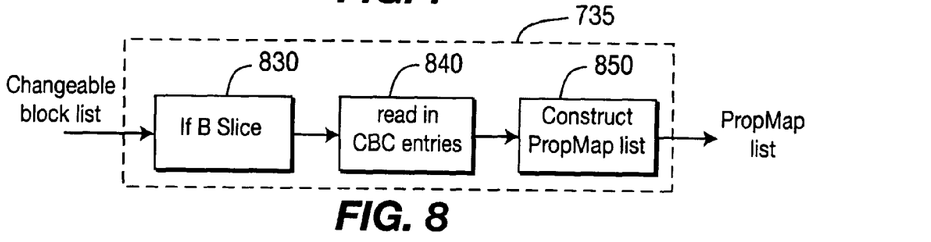
FIG. 8 illustrates a propagation map initialization.

Propagation map initialization 735 is illustrated in FIG. 8 and is integrated into the H.264/AVC decoder's slice initialization process 730. This initialization extracts from the list of potential modifications those modifications that apply to blocks in the current B-slice 830 and builds one propagation map 850 for each potential current block change 840.

Figure 9:
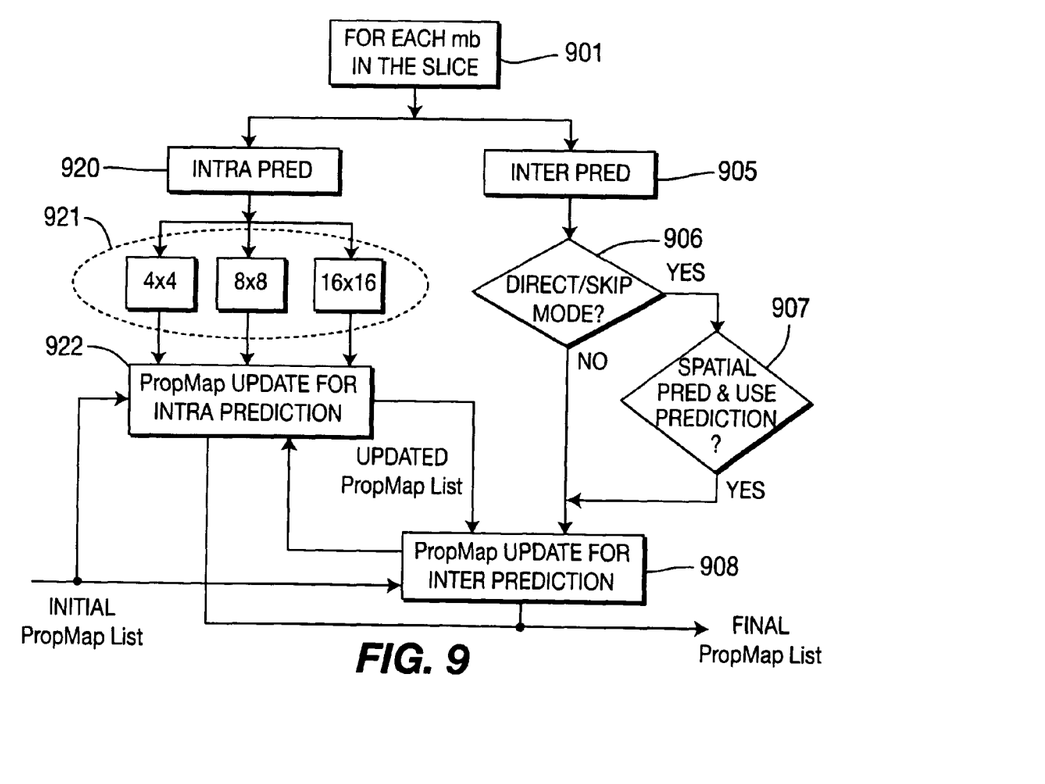
FIG. 9 illustrates steps for producing a final propagation map list.

A propagation map builder in FIG. 9, which is integrated into the slice decoder 840, adds blocks to the propagation maps of potential modifications as the decoder processes each macroblock. Each macroblock considered in a slice is represented by box 901. When decoding one block, a determination is made as to which of a number of different coding cases has been used. The cases are inter-prediction, inter-prediction with spatial direct mode, and intra-prediction in box 920 for the different intra-prediction types 921. FIG. 9 shows an inter-prediction path 905 in which a determination is made in direct/skip decision box 906 as to whether blocks that are inter-predicted in direct mode. If the inter-predicted blocks are not inter-predicted in direct mode, then the propagation map is updated according to a propagation update process 908. Further, if the inter-predicted blocks are not spatially predicted in determination box 907, then the inter-predicted blocks will not be affected by changes to the neighboring blocks and will not be part of any propagation map. All others are examined to determine if they will be affected by previous changes. Inter-predicted blocks that do not use direct mode as shown in direct/skip decision box 906 are examined by the propagation update process 908 and this process is described in FIG. 10.

Figure 10:
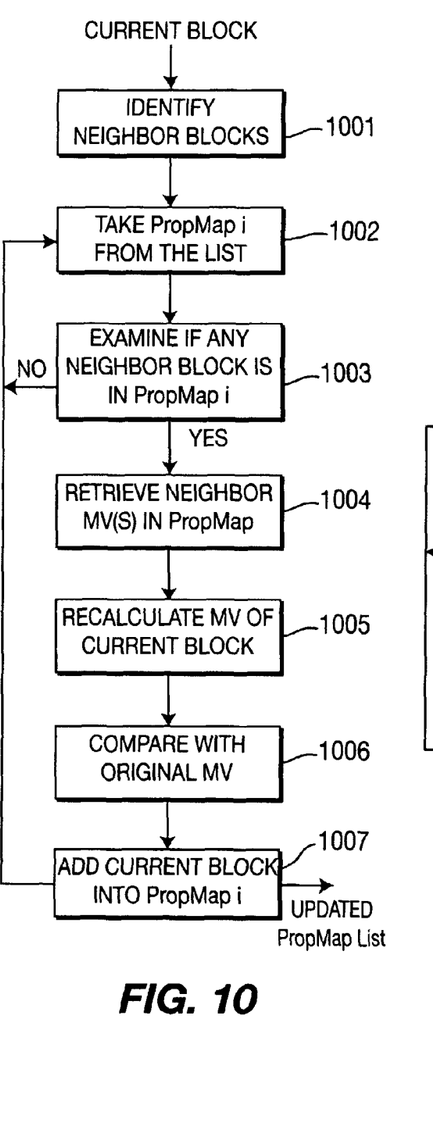
FIG. 10 illustrates a propagation update process.

In FIG. 10, the neighboring blocks are first identified in box 1001. This identification is based on the motion vector predictions MVp as described earlier and the availability of the neighbors. Of importance and concern here are neighbors that can affect the determination of the current MVp and such neighbors are referred to as identified neighbors. Sampling 1002 through all the propagation map lists and examining neighbor box 1003 determine which of these identified neighbor blocks are in any of the propagation maps. If an identified neighbor falls in a propagation map, this implies that that neighbor has been affected by the potential modification at the head of that map. That change therefore has the potential to propagate to the current block. If no neighbors fall in a propagation map in box 1003, the next map is sampled in box 1002. For each instance of an identified neighbor falling in an existing propagation map, a retrieval 1004 of the motion vectors stored in the propagation map list is performed. With the modified neighbor motion vectors, a recalculation 1005 of the current block is performed. This motion vector prediction for the current block is compared with the result with the original motion vector in box 1006. If they are different, then the change at the head of the propagation map will affect the current block and the current block is added to the corresponding propagation map in box 1007.

Figure 11:
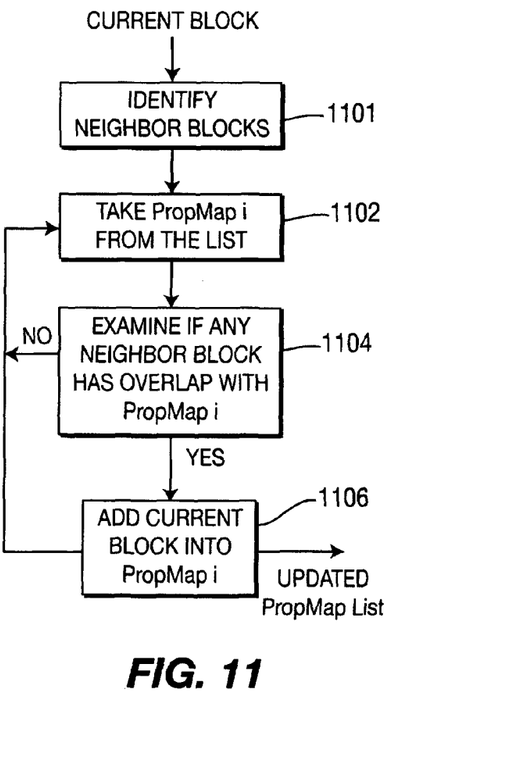
FIG. 11 illustrates a propagation map update for intra prediction.

For updating a propagation map according to only intra-prediction, all intra-prediction blocks with any of the three modes/types 921 (i.e. 4×4, 8×8 or 16×16) are examined by the propagation map update process 922 described in FIG. 11.

Similar to the examination of inter-predicted blocks, first, an identification of the neighbor blocks of current block is made. This identification is based on the intra-prediction mode as described above. Here, the concern is with neighbors that can affect the pixel prediction of the current partition. Such neighbors are referred to as identified neighbors in box 1101. Every propagation map in the list can or is sampled in box 1102 and examined in box 1104. If any identified neighbor block overlaps with a propagation map, the current node is added to that propagation map in box 1106.

The final step shown in FIG. 7 is slice setdown 850. This can be a standard step of an AVC decoder 810, once the slice has been decoded. The final step of propagation map construction is the output of the propagation map. This step is integrated into the slice setdown 850. An optional decoded yuv file containing pixel values can also be output for further analysis.

It is important to note that in the above algorithm that there can be a need to go through all the nodes of the l propagation maps for every macroblock partition. This can incur a high computational cost. To speed up the process, an improved algorithm is formulated based on two observations. The first is that the parents of the current partition (identified neighbors) can only reside within the same row of macroblocks or the row above; as such, the nodes of list i which are more than one row away from the current block can be excluded during the parent search. The second is that if list i has not been updated for an entire row of macroblocks, the effect of modification on changeable block will not be able to propagate to the remaining blocks in the slice. Thus, the propagation map i is complete and there is no need to check future or later blocks within the current slice. The modified algorithm is presented in FIG. 12.

Figure 12:
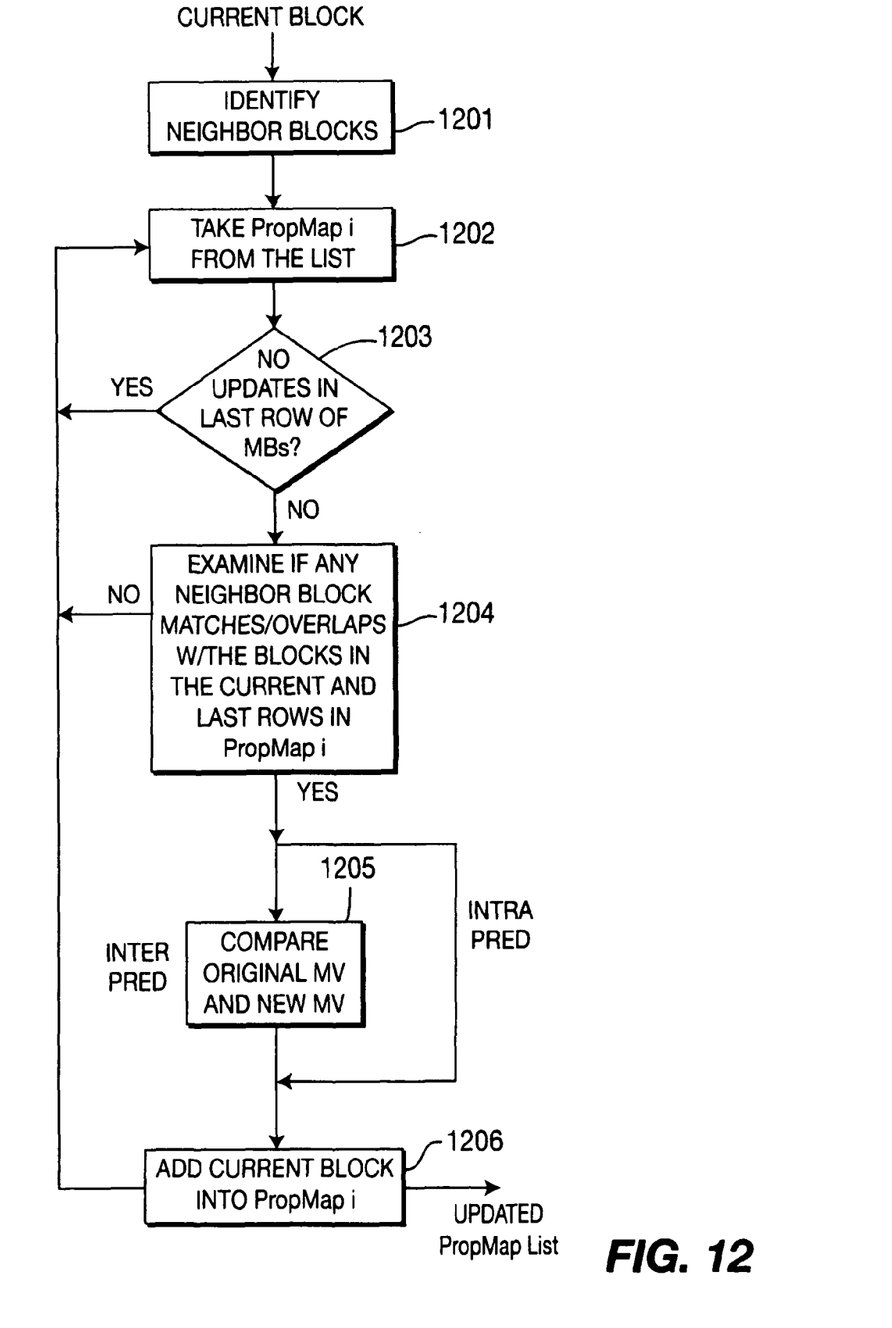
FIG. 12 illustrates an optimized propagation map update for inter/intra prediction.

For updating a propagation map according to intra-prediction and inter-prediction, FIG. 12 begins with first identifying neighbors in box 1201 that can affect the pixel prediction of the current partition. Such neighbors are referred to as identified neighbors in box 1201. Propagation maps in the list are then sampled in box 1202. If there are no updates in the last row of macroblock in the decision box 1203, the next propagation map is sampled. If there is an update, then an examination is performed in box 1204. If any identified neighbor block overlaps or matches with blocks in the current and last rows in the currently sampled propagation map i, the process is advanced to a comparison step in box 1205. If the original motion vector and a modified motion vector differ, then the current node with the modified motion vector is added to the propagation map in box 1206 along with the updates from the intra-prediction.

In sum, several of the implementations and features described in this application have been presented in the context of the H.264/MPEG-4 AVC (AVC) standard. However, these implementations and features can be used in the context of another standard (existing or future), or in a context that does not involve a standard.

The implementations described herein can be implemented in, for example, a method or process, an apparatus, a software program, a datastream, or a signal. Even if only discussed in the context of a single form of implementation (for example, discussed only as a method), the implementation or features discussed can also be implemented in other forms (for example, an apparatus or program). An apparatus can be implemented in, for example, appropriate hardware, software, and firmware. The methods can be implemented in, for example, an apparatus such as a computer or other processing device. Additionally, the methods can be implemented by instructions being performed by a processing device or other apparatus, and such instructions can be stored on a computer readable medium such as a CD, or other computer readable storage device, or an integrated circuit. Further, a computer readable medium can store the data values produced by an implementation.

As should be evident to one of skill in the art, implementations can also produce a signal formatted to carry information that can be stored, deployed or transmitted. The information can include, for example, instructions for performing a method, or data produced by one of the described implementations. For example, a signal can be formatted to carry a watermarked stream, an unwatermarked stream, or watermarking information.

Embodiments of the inventions include an apparatus equipped with hardware, firmware, and/or software, or the like, which function as means to perform the various process steps and combinations of process steps described in this specification.

Additionally, features of the invention are intended to include the use of chrominance change instead on luminance change or in combination with luminance change as a metric or criterion for generating lists of acceptable change and/or evaluating changes or watermarks.

Additionally, many implementations can be implemented in one or more of an encoder, a decoder, a post-processor that processes output from a decoder, or a pre-processor that provides input to an encoder. Further, other implementations are contemplated by this disclosure. For example, additional implementations can be created by combining, deleting, modifying, or supplementing various features of the disclosed implementations.

The invention claimed is:

1. A method comprising the steps of:
    selecting a watermark that can be embedded in an encoded video image having a given luminance, wherein the video image comprises blocks;
    estimating a quantitative value of change in the given luminance of the video image if the watermark were embedded in the encoded video image, wherein the estimated change in luminance is a function of the prediction of the blocks;
    accepting or rejecting the watermark responsive to the quantitative value comprising:
        using the estimated luminance change as a fidelity criterion;
        evaluating the watermark based on said fidelity criterion as being a perceptible change or an imperceptible change;
        accepting watermarks which result in imperceptible changes;
    adding accepted ones of the watermarks to a list, wherein the watermarks added to the list are acceptable watermarks for embedding.

2. The method of claim 1 wherein the method further comprises the step of:
    implementing the estimating step based on some but not all of the blocks of the video image.

3. The method of claim 1 further comprising the step of generating a detection reference value for watermark detection responsive to the changes in the given luminance.

4. The method of claim 1 further comprising the step of embedding one of the accepted watermarks from the list into the video image.

5. The method of claim 1 further comprising the steps of:
    comparing watermarks in the list to a payload constraint;
    removing from the list watermarks that do not meet payload constraint.

6. The method of claim 1 wherein the step of estimating comprises performing an inter-predicted estimation, wherein said estimation is a function of the motion compensated prediction function, the motion vectors before and after said watermark application and any prediction weights associated with said block.

7. The method of claim 6 wherein the watermark modifies only one motion vector.

8. The method of claim 1 wherein the step of estimating comprises performing an intra-predicted estimation, wherein said estimation is a function of the intra-prediction mode and the luminance change of at least one neighbor block.

9. The method of claim 1 further comprising:
    constructing a propagation map for the selected watermark before the step of accepting, wherein the propagation map includes all the blocks having some change in said luminance estimation as a result of the watermark application.

10. The method of claim 9 wherein the propagation map stores a reference frame number, original and new motion vectors for an inter-predicted block in said map.

11. The method of claim 9 wherein the propagation map stores a reference neighbor block number and a prediction mode for an intra-predicted block in said map.

12. The method of claim 1 wherein the estimated value of the luminance change of a block is the sum of the absolute values of estimated luminance change for each pixel in a block.

13. The method of claim 1 wherein the estimated value of the luminance change of a block is the maximum absolute value of estimated luminance change for each pixel in a block.

14. The method of claim 9 wherein the propagation map construction is integrated in a video decoder.

15. The method of claim 14 wherein the luminance calculation is integrated with the video decoder.

16. The method of claim 14 wherein the luminance estimation is reset at the beginning of each slice of a frame.

17. An apparatus comprising a processor configured to perform the steps of:
    selecting a watermark that can be embedded in an encoded video image having a given luminance, wherein the video image comprises blocks;
    estimating a quantitative value of change in the given luminance of the video image if the watermark were embedded in the encoded video image, wherein the estimated change in luminance is a function of the prediction of the blocks; accepting or rejecting the watermark responsive to the quantitative value comprising:
        using the estimated luminance change as a fidelity criterion;
        evaluating the watermark based on said fidelity criterion as being a perceptible change or an imperceptible change;
        accepting watermarks which result in imperceptible changes; and
        rejecting watermarks which result in perceptible changes; and,
        adding accepted ones of the watermarks to a list, wherein the watermarks added to the list are acceptable watermarks for embedding.

18. The apparatus of claim 17 further configured to perform the step of:
    implementing the estimating step based on some but not all of the blocks of the video image.

19. The apparatus of claim 17 further configured to perform the step of generating a detection reference value for watermark detection responsive to the changes in either one of the given luminance and the given chrominance.

20. The apparatus of claim 17 further configured to perform the step of embedding one of the accepted watermarks from the list into the video image.

21. The apparatus of claim 17 further configured to perform the steps of:
comparing watermarks in the list to a payload constraint;
removing from the list watermarks that do not meet payload constraint.

22. The apparatus of claim 17 wherein said apparatus is configured to perform the step of estimating by performing an inter-predicted estimation is a function of the motion compensated prediction function, the motion vectors before and after said watermark application and any prediction weights associated with said block.

23. The apparatus of claim 22 wherein the watermark modifies only one motion vector.

24. The apparatus of claim 17 wherein said apparatus is configured to perform the step of estimating by performing an intra-predicted estimation is a function of the intra-prediction mode and the luminance change of at least one neighbor block.

25. The apparatus of claim 17 further configured to perform the step of:
constructing a propagation map for the selected watermark before the step of accepting, wherein the propagation map includes all the blocks having some change in said luminance estimation as a result of the watermark application.

26. The apparatus of claim 25 wherein the propagation map stores a reference frame number, original and new motion vectors for an inter-predicted block in said map.

27. The apparatus of claim 2 wherein the propagation map stores a reference neighbor block number and a prediction mode for an intra-predicted block in said map.

28. The apparatus of claim 17 wherein the estimated value of the luminance change of a block is the sum of the absolute values of estimated luminance change for each pixel in a block.

29. The apparatus of claim 17 wherein the estimated value of the luminance change of a block is the maximum absolute value of estimated luminance change for each pixel in a block.

30. The apparatus of claim 25 wherein the propagation map construction is integrated in a video decoder.

31. The apparatus of claim 30 wherein the luminance calculation is integrated with the video decoder.

32. The apparatus of claim 30 wherein the luminance estimation is reset at the beginning of each slice of a frame.

\* \* \* \* \*